United States Patent [19]

Kempa

[11] 4,250,037
[45] Feb. 10, 1981

[54] PLUMBING FIXTURE WITH INTEGRAL STRAINER

[76] Inventor: John F. Kempa, 306 SW. Cimarron Cir., Palm Bay, Fla. 32905

[21] Appl. No.: 24,873

[22] Filed: Mar. 28, 1979

[51] Int. Cl.³ .............................................. B01D 35/02
[52] U.S. Cl. ..................................... 210/310; 210/311
[58] Field of Search ........................ 210/311, 310, 314

[56] References Cited

U.S. PATENT DOCUMENTS

| | | | |
|---|---|---|---|
| 604,450 | 5/1898 | White | 210/311 X |
| 939,551 | 11/1909 | Schebler | 210/311 |
| 1,192,265 | 7/1916 | Bird | 210/310 |
| 1,641,938 | 9/1927 | Traut | 210/314 |
| 1,715,492 | 6/1929 | Bassion | 210/310 |
| 1,822,440 | 9/1931 | Jacobson | 210/311 X |
| 2,034,242 | 3/1936 | Mautner | 210/310 |
| 2,503,566 | 4/1950 | Scott | 210/311 X |

Primary Examiner—Frank A. Spear, Jr.
Attorney, Agent, or Firm—Richard Dixon

[57] ABSTRACT

A plumbing fixture with an integral strainer is provided for separating solids and other foreign bodies from a liquid flowing through a pipe. A generally T-shaped conduit section is provided having at least three portals including an input and an output portal for being operably interposed along the pipe for passing the fluid therethrough. The conduit also includes an access portal and a removable closure coupled thereto for allowing external access to within the conduit. A strainer is provided within the conduit and generally adjacent to the access portal for separating solids from the liquid flowing therethrough. The strainer is typically positioned above the access portal for allowing gravitational displacement of the solids toward the access portal after the liquid flow pressure has subsided.

3 Claims, 6 Drawing Figures

PLUMBING FIXTURE WITH INTEGRAL STRAINER

BACKGROUND OF THE INVENTION

I. Field of the Invention

The present invention relates to waste drain pipes such as the types used with sinks, other plumbing fixtures and irrigation systems, and more particularly to sections of plumbing pipes which are designed to separate solids and other foreign bodies from the waste liquids flowing through the pipes.

II. Description of the Prior Art

The prior art includes many patent and other references which disclose plumbing devices of the type utilized for operably connecting sinks, washbasins and other such plumbing fixtures so as to prevent the flow of solid matter into the drainage system. Several of these devices are specifically designed to catch valuable items such as rings, contact lenses and so forth, which are frequently lost into the drainage system.

The prior art contains many forms of plumbing traps which employ removable strainers. The following patents are samples of those prior art references: U.S. Pat. Nos. 594,169; 3,466,901; 1,198,759; 1,903,366; 1,217,763; 2,693,734; 1,770,639; 3,747,771; 1,817,376; 3,788,485; 1,886,676; 4,032,455.

U.S. Pat. No. 3,466,901 issued to Reid discloses a generally T-shaped plumbing section which is used in conjunction with a pump in a laundry-type device. It should be noted that the Reid device does not include an access aperture which allows the operator to inspect and clean the partial strainer which is enclosed within the plumbing section. Furthermore, the Reid strainer does not effectively separate all of the solids from the fluids flowing adjacent thereto.

While many of these prior art devices are effective for their original design, they are nevertheless expensive to produce and are not directly applicable to modern plumbing fixtures and designs. These disadvantages are especially pronounced when cleaning the strainer is required. It is typically very difficult for the operator to obtain direct access to the strainer in order to remove hair, grease or other solids which foul the strainer, and in order to retrieve valuables such as rings or contact lenses from the strainer when lost into the drainage system.

The present invention is primarily designed in order to be inexpensively produced by plastic injection molding techniques. More specifically, it is envisioned that with many of the embodiments disclosed herein the strainer or screen may be integrally molded into the device in order to reduce costs and minimize assembly expenses.

BRIEF DESCRIPTION OF THE DRAWINGS

Other objects, features and advantages of the present invention will be apparant from a study of the written description and the drawings in which.

Figure 1:
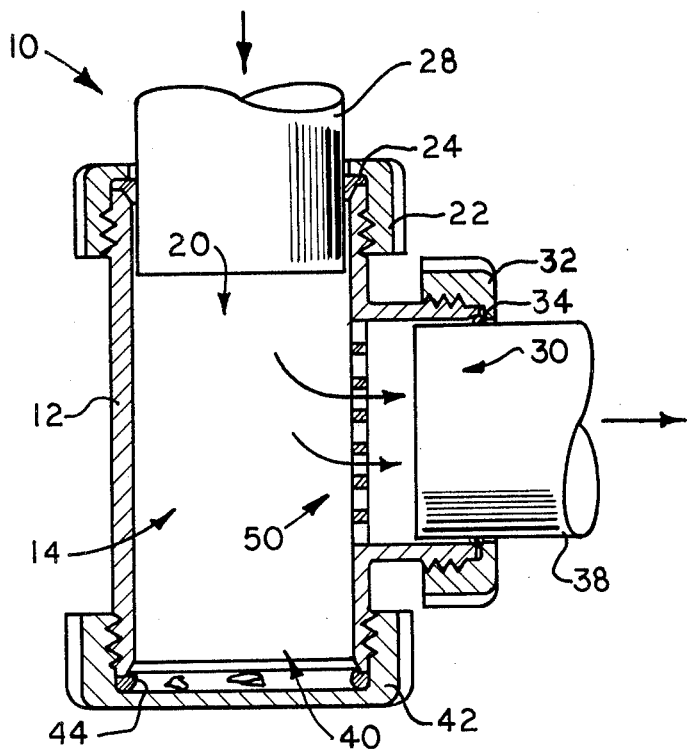
FIG. 1 illustrates a frontal cross-section elevation of a first preferred embodiment of the plumbing device in accordance with the teachings of the present invention.

In these drawings, like reference characters refer to like parts throughout the several views of each of the embodiments of the present invention. However, variations and modifications may be effected without departing the spirit or scope of the concepts of the disclosure and the appended claims. It should also be observed that the elements and operation of the embodiments of the present invention have been illustrated in somewhat simplified form in each of these drawings and in the specification in order to eliminate unnecessary details which would be apparent to one skilled in this art.

DETAILED DESCRIPTION OF THE PREFERRED EMBODIMENT

A frontal cross-section view of a first preferred embodiment of the plumbing coupler or fixture in accordance with the present invention is shown generally as 10 in FIG. 1. This plumbing coupler 10 includes a generally T-shaped body section 12 which defines adjacent the distended ends thereof an input portal 20, an output portal 30 and an access portal 40. The input portal 20 is generally circular in cross-section in order to form a close fit with an input pipe 28 into which the fluid and solids flow. The pipe 28 is coupled to the T-shaped body section 12 through an O-ring 24 which is pressed into firm engagement with the input pipe 28 by operation of a cap 22 which is coupled by a plurality of threads to the T-shaped body section 12.

In a similar fashion an output pipe 38 is coupled congruently within the output portal 30 and sealed therein by operation of an O-ring 34 which is compressed by operation of an output cap 32 which is coupled by a plurality of threads to the generally T-shaped body section 12.

The access portal 40 is generally closed by an access cap 42 which, together with an O-ring 44, is secured to the generally T-shaped body section 12 by a plurality of threads. The access cap 42 may be removed in order to provide direct access by the operator to an internal void 14 defined within the body section 12.

Figure 6:
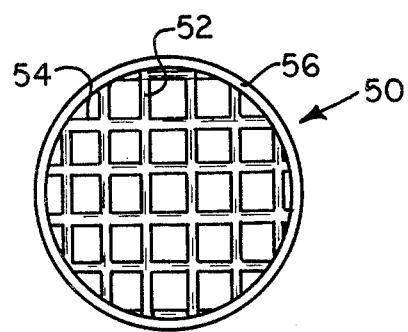
FIG. 6 illustrates a frontal elevation of the strainer mesh as utilized in the third embodiment illustrated generally in FIGS. 4 and 5, and optionally in the second embodiment as illustrated in FIG. 2.

The section of the void 14 adjacent to the input portal 20 and the access portal 40 is separated from the section of the void 14 adjacent to the output portal 30 by a mesh-type strainer 50, which is also shown in a frontal view in FIG. 6. This strainer 50 includes a plurality of generally vertical members 52 and intersecting horizontal members 54 which are supported by a main circumferential frame 56. In FIG. 6 the mesh strainer 50 is illustrated as a separate unit which may be disconnected and separated from the body section 12, but in the preferred embodiment of the present invention the strainer 50 is molded integrally into the body 12 in order to eliminate costly machining and assembly expenses. The size of the apertures between the vertical members 52 and the horizontal members 54 is typically 0.3 inches square, but this dimension may be changed as required in accordance with the specific applications for which the device is required. While the present embodiment envisions molding body 12 and the strainer 50 from plastic, it may also be possible to form the strainer 50 from wire mesh, sheets of plastic with perforations or molded therein, etc.

With reference to FIG. 1, it should be noted that the strainer 50 is oriented in a generally vertical plane which is typically coincident with the circumference of the body section 12. In this manner the solid particles or other foreign bodies which are separated from the liquid by the operation of the strainer 50 will tend to be pulled downwardly by gravitational forces when the supporting forces derived from the flow of the liquid over the strainer 50 have subsided. In this manner the solid particles which are separated from the liquid will tend to fall into the lower part of the internal void 14 so as to collect generally within the access cap 42.

The collected solid materials or other contaminants may be removed from within the internal void 14 by unscrewing the access cap 42 from the end of the body section 12 adjacent to the access portal 40, and then rinsing out the internal section of the access cap 42. While the access cap 42 has been removed from the body section 12, the operator may easily clean other solid materials and contaminants from the front surface of the strainer 50 by merely inserting a cleaning device, such as a brush or similar instrument, into the void 14 and running the cleaning instrument over the strainer 50. For this reason it is desirable to locate the access portal 40 and the access cap 42 as close to the strainer 50 as practical so that the operator may use his hand or fingers for scraping clean the strainer 50.

Figure 3:
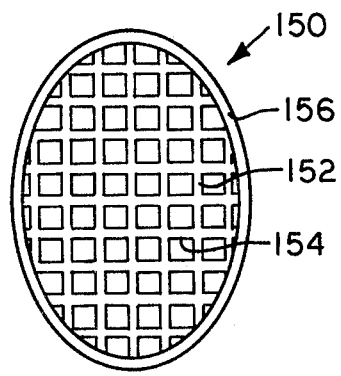
FIG. 3 illustrates a frontal elevation of the strainer mesh of the present invention.
Figure 2:
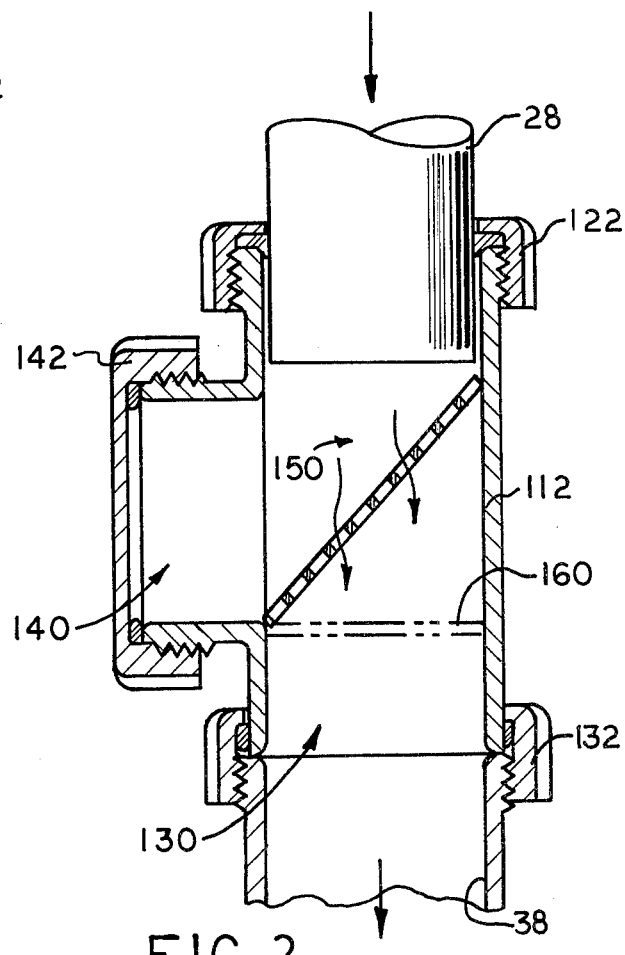
FIG. 2 illustrates a frontal cross-section elevation of a second embodiment of the plumbing conduit in accordance with the teachings of the present invention.

An alternate or second embodiment of the present invention is illustrated generally in the cross-section view of FIG. 2. This embodiment is generally similar to the first embodiment illustrated in FIG. 1 except that the positions of the access portal, now referred to as 140, and the output portal, now referred to as 130, have been interchanged so as to provide a straight through flow of the liquid from the input pipe 28 to the output pipe 38. As illustrated in FIG. 2, a mesh strainer 150 has been placed within the internal void 114 within the body section 112 so that one end thereof will be elevated with respect to the horizontal. In this manner as the solid particles are separated from the fluid flowing through the strainer 50, the solid particles and other contaminants may be pulled by gravitational forces downwardly so as to come to rest generally adjacent to an access cap 142 which covers the access portal 140. A front elevation of the mesh strainer 150 is illustrated in FIG. 3 as being formed from a plurality of generally perpendicularly intersecting vertical and horizontal members as previously described with regard to FIG. 6. It will be observed that it may be necessary to construct the strainer 150 in an oval shape in order to assure that the effective area of the strainer 50 is generally coextensive with the area of flow of the fluid through the conduit 112.

It will be observed that the second embodiment may also be used in the horizontal mode, that is with the input pipe 28 and the output pipe 30 running generally horizontal, as long as the access portal 140 and the access cap 142 are located below the mesh strainer 150 for receiving the solid particulate matter and contaminants therein. In this orientation it would also be possible for the mesh strainer 150 to be mounted perpendicular to the flow of fluid at a point typically adjacent to the output portal 130, as long as the bottom edge of the strainer 150 would be adjacent to the access portal 140 for depositing the solid particulate matter adjacent thereto.

Figure 4:
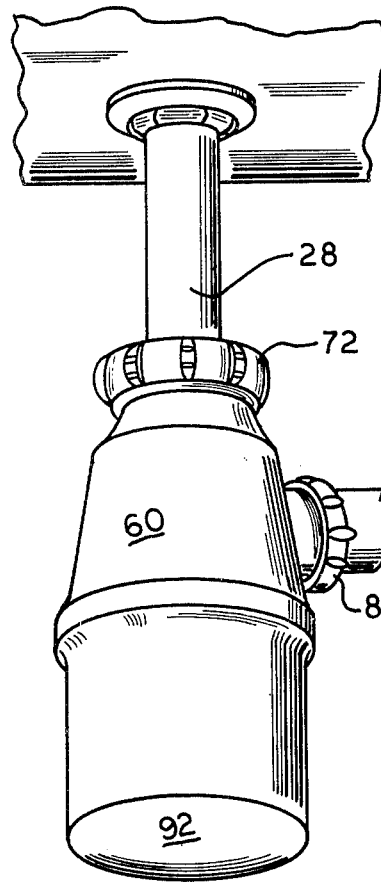
FIG. 4 illustrates a frontal perspective view of a third embodiment of the present invention which also employs a drain trap.
Figure 5:
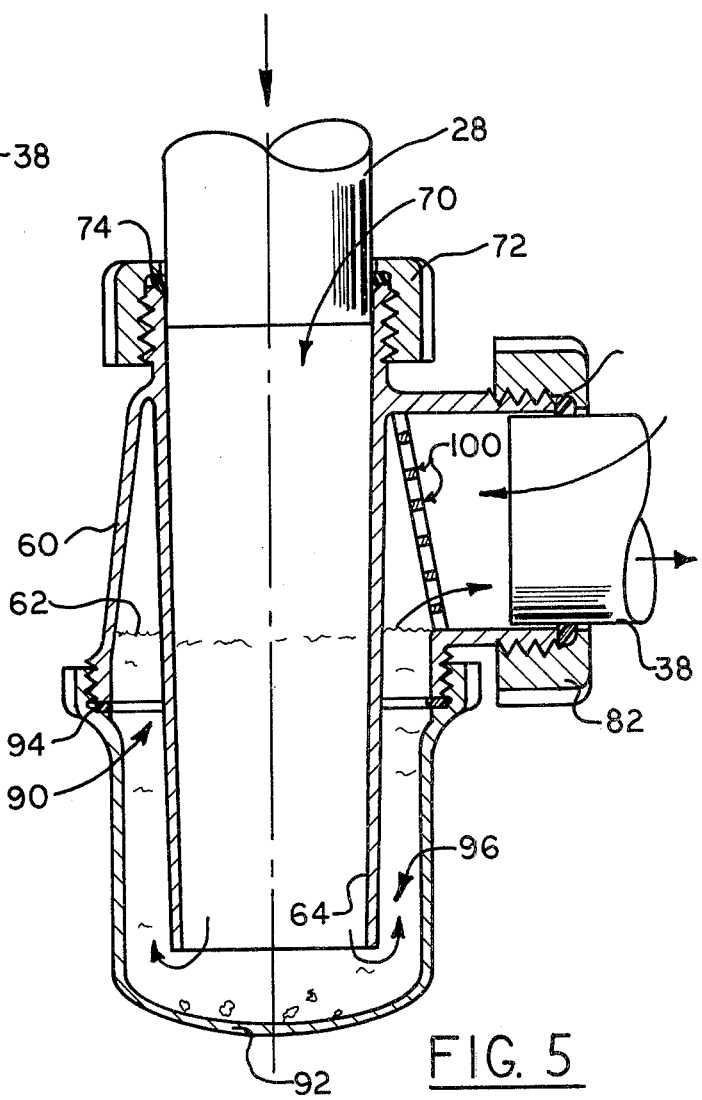
FIG. 5 illustrates a frontal cross-section view of the third embodiment as illustrated generally in FIG. 4.

An alternate or third embodiment of the present invention is shown generally in FIGS. 4 and 5. This embodiment is basically similar to the embodiments illustrated in FIGS. 1 and 2 in that the main body section, now indicated as 60, retains its characteristic T-shape between the input pipe 28 and the output pipe 38. However, in this embodiment an extension of the input portal has been added and the size of the access portal and access cap have been enlarged.

More specifically, the body section 60 adjacent to an input portal 70 has been extended downwardly so as to communicate through an access portal 90 and into an access void or reservoir 56 defined within an access cap 92. A distended end 62 of the body section 60 opens into the reservoir 96 at a point substantially below the fluid level 66 within the body section 60 so as to function as a gas trap for preventing the flow of gases from the output pipe 30 through and into the input pipe 28. The fluid level 66 within the body section 60 will tend to stabilize at a level generally equal in vertical height to the lower end of the input pipe 38.

A mesh-type strainer 100 is located adjacent to an output portal 80 at a point generally along the extension of the circumferential body section 60. The mesh strainer 100 has an effective diameter which is generally coextensive with the effective diameter of the output pipe 38 and the output portal 80. The frontal view of the mesh strainer 100 is generally similar to the mesh strainer as illustrated in FIG. 6, and comprises a plurality of generally perpendicularly intersecting vertical and horizontal members which define liquid flow-through apertures therebetween. As with the other embodiments of this invention, the size of the apertures will be determined in accordance with the specific application of the present invention, but the apertures will be sized generally so as to prevent the passage of solid or particulate matter therethrough.

The flow of these solid particles is interrupted by the mesh strainer 100, and then the solid particles are generally pulled by gravitational forces downwardly and into the reservoir 96 defined within the access cap 92. In this manner the solid particulate matter may be removed from the trap and strainer of the plumbing fixture by merely unscrewing the access cap 92 and disconnecting it from the main body section 60. The solid materials and particles should be easily removable from within the reservoir 96 defined within the access cap 92.

As in the other embodiments, the strainer 100 is located adjacent to and generally above the access portal 90 and the access cap 92 so that gravitational forces may be utilized to draw the solid particles downwardly from the mesh strainer 100 after the pressure induced by the flow of fluid through the strainer 100 has subsided. While it is somewhat more difficult to clean hair and other long and stringy materials from the strainer 100, the separation between the distended end 62 of the body section 60 and the strainer 100 will still allow a brush or other cleaning article to be used for loosening and removing contaminants from the strainer 100. While the strainer 100 may be detachable from the body section 60, it may be possible and indeed preferable to mold the strainer 100 as an integral part of the body section 60.

The first and second embodiments of the plumbing fixtures in accordance with the present invention as illustrated in FIGS. 1 and 2 have been described primarily for use as couplings directly interposed along a section of drainage tubing. These embodiments may be utilized either with or without associated drainage traps as required. These embodiments may also be utilized for operatively coupling multiple fixtures such as sinks, etc., together so that one trap may be utilized for all of the devices. The third preferred embodiment as illustrated in FIG. 4 has been designed primarily to combine the safety of the strainer with the convenience of an integral gas trap. This embodiment may be utilized in a variety of different applications and should not be limited to conventional uses such as with respect to sinks, washbowls, drinking fountains, etc. These embodiments may also be used for the same or related purposes in well plumbing systems, irrigation systems or other similar applications.

In accordance with the provisions of the United States Patent Laws, preferred embodiments of the present invention have been described in detail. The principles of the present invention have been described in the best mode in which it is now contemplated that such principles may be applied. However, it should be understood that the construction shown and described in the attached specification and drawings are merely illustrative and that the invention is not limited thereto. Accordingly, alterations and modifications which readily suggest themselves to persons skilled in the art, without departing from the true spirit of the disclosure herein, are intended to be included in the scope of the following claims.

I claim:

1. A gas trap which separates solids and other foreign bodies from liquids flowing through a pipe from sinks, laundry tubs and the like, said gas trap comprising in combination:

a conduit section having at least 3 portals including an input portal and an output portal for being operatively interposed along the pipe for passing the liquids therethrough, said conduit section further including therein an access portal and a removable closure coupled thereto for allowing external access to within said conduit section, with said closure located below said input and output portals, and with said closure defining a recess therein for receiving and storing the accumulated solids within a reservoir of the liquid;

an input tube located within said conduit section and operatively coupled to said input aperture while extending into and opening below the liquid level within said reservoir of liquid adjacent to said closure, whereby a gas trip is operatively defined therein; and strainer means carried within said conduit section covering said output portal for separating solids from liquids flowing therethrough, with one end of said strainer means being elevated from the horizontal for allowing gravitational displacement of the solids toward said access portal, with said strainer means comprising a mesh sheet which forms an integral part of a side wall of said conduit section adjacent said output portal, whereby the solids may migrate towards said access portal after the liquid flow has subsided.

2. The trap as described in claim 1 wherein said mesh is molded as an integral part of said side wall of said conduit section.

3. The trap as described in claim 2 wherein said closure and said conduit section generally surround and are narrowly separated from said input guide so as to form a vertical standpipe filled with the liquid as it flows through to said output portal.

* * * * *